(12) United States Patent
Bharatia et al.

(10) Patent No.: US 12,316,641 B2
(45) Date of Patent: May 27, 2025

(54) SYSTEMS AND METHODS FOR PROVIDING PRIORITIZATION FOR DATA TRANSPORT SERVICES

(71) Applicant: Verizon Patent and Licensing Inc., Basking Ridge, NJ (US)

(72) Inventors: Jayshree A. Bharatia, Plano, TX (US); Rakesh Chandwani, Morganville, NJ (US); Toby Varughese John, Murphy, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 314 days.

(21) Appl. No.: 18/048,805

(22) Filed: Oct. 21, 2022

(65) Prior Publication Data
US 2024/0137366 A1   Apr. 25, 2024
US 2024/0236100 A9   Jul. 11, 2024

(51) Int. Cl.
*H04L 9/40*    (2022.01)
*H04L 67/14*   (2022.01)

(52) U.S. Cl.
CPC ........ *H04L 63/102* (2013.01); *H04L 63/0853* (2013.01); *H04L 63/105* (2013.01); *H04L 67/14* (2013.01)

(58) Field of Classification Search
None
See application file for complete search history.

(56) References Cited

U.S. PATENT DOCUMENTS

| | | | |
|---|---|---|---|
| 11,324,057 B2 * | 5/2022 | Padebettu | H04L 12/4633 |
| 2012/0167179 A1 * | 6/2012 | Evans | H04L 67/62 |
| | | | 726/4 |
| 2013/0273876 A1 * | 10/2013 | Rasanen | H04L 65/1016 |
| | | | 455/404.1 |
| 2019/0327320 A1 * | 10/2019 | Rubin | H04L 5/1469 |
| 2021/0385283 A1 * | 12/2021 | Talebi Fard | H04W 12/06 |
| 2021/0410059 A1 * | 12/2021 | Talebi Fard | H04L 65/1069 |
| 2023/0239667 A1 * | 7/2023 | Suh | H04L 65/1073 |
| 2023/0345355 A1 * | 10/2023 | Talebi Fard | H04L 65/1073 |

\* cited by examiner

*Primary Examiner* — Kaveh Abrishamkar

(57) ABSTRACT

A network device may receive a subscription request to subscribe to a multimedia priority service (MPS) for a user device, and may generate an MPS profile for the user device based on the subscription request. The network device may store the MPS profile in a data structure, and may receive, from the user device, a request to generate an MPS token for the user device. The network device may retrieve the MPS profile from the data structure based on the request to generate the MPS token, and may generate the MPS token based on the MPS profile. The network device may provide the MPS token to the user device.

20 Claims, 10 Drawing Sheets

SYSTEMS AND METHODS FOR PROVIDING PRIORITIZATION FOR DATA TRANSPORT SERVICES

BACKGROUND

Telecommunication network operators currently support prioritized services for priority subscribers (e.g., national security and emergency preparedness and public safety subscribers) for voice, data, and other services. Multimedia priority services (MPSs) enable priority subscribers to make priority calls. Design and feature implementations deployed in many networks provide priority to priority subscribers over normal users in a radio access network (RAN), an evolved packet core (EPC), and an Internet protocol (IP) multimedia subsystem (IMS). Although many RAN advancements improved accessibility for priority subscribers during an emergency or a crisis, accessibility and capacity bottlenecks remain for critical services.

DETAILED DESCRIPTION OF EXAMPLE EMBODIMENTS

Figure 1A:
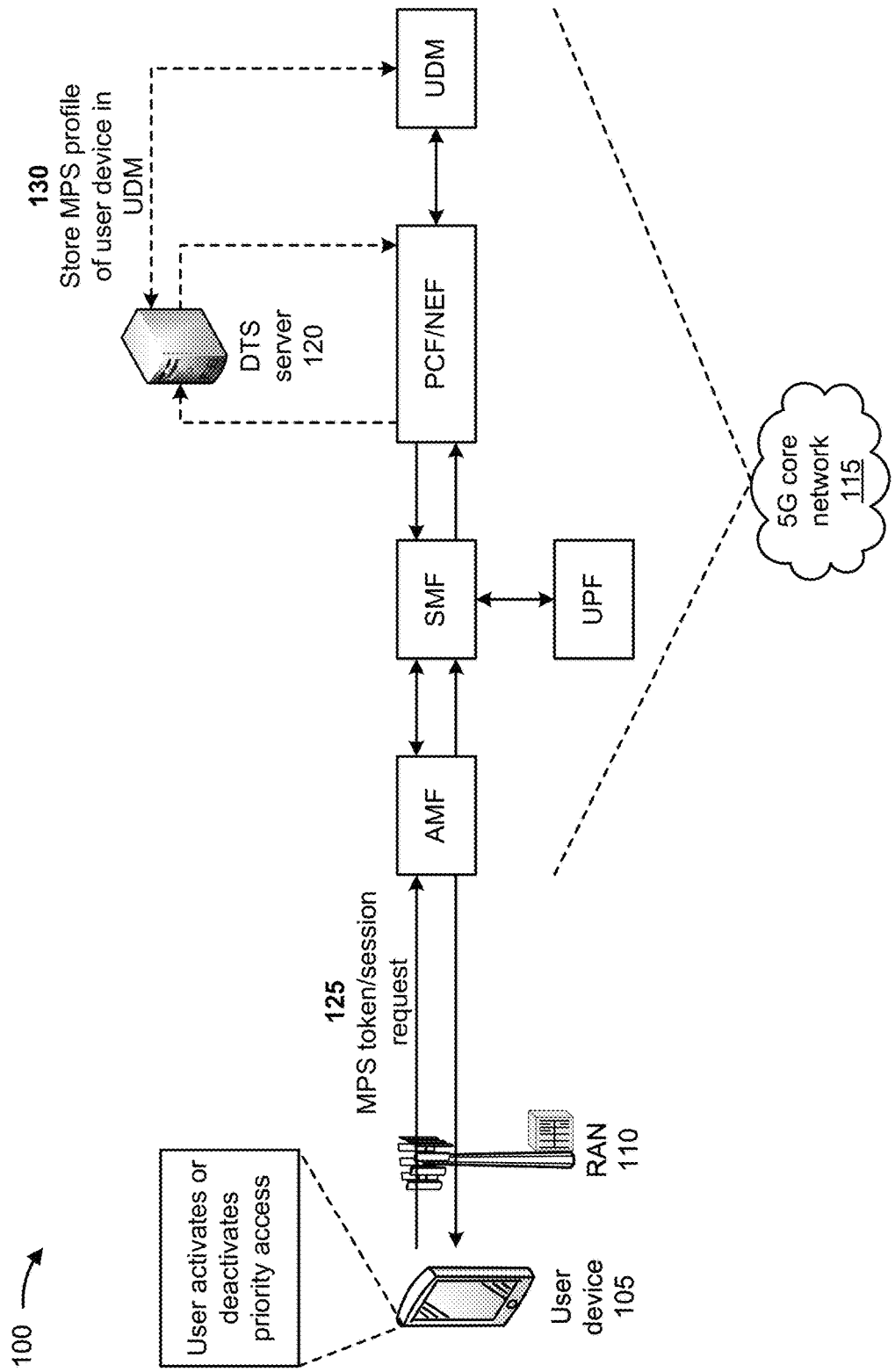
FIGS. 1A-1G are diagrams of an example associated with providing prioritization for data transport services.

The following detailed description of example implementations refers to the accompanying drawings. The same reference numbers in different drawings may identify the same or similar elements.

A national security/emergency preparedness (NS/EP) multimedia priority service (MPS) may facilitate emergency response and recovery operations by government-authorized personnel and/or emergency management officials (e.g., for natural disasters, such as floods, earthquakes, and hurricanes, and for man-made disasters). The NS/EP MPS may extend existing voice-based NS/EP service to support priority multimedia services, such as voice, data, video, and information services. However, such priority multimedia services cannot be provided since the priority multimedia services require a prioritized data transport mechanism where sessions initiated and/or terminated by an MPS subscriber can be prioritized.

Thus, current mechanisms for providing MPS sessions consume computing resources (e.g., processing resources, memory resources, communication resources, and/or the like), networking resources, and/or other resources associated with failing to provide an MPS due to lack of a prioritized data transport mechanism, poorly handling emergency events due to lack of a prioritized data transport mechanism, failing to prioritize an MPS due to lack of a prioritized data transport mechanism, and/or the like.

Some implementations described herein provide a network device (e.g., a data transport service (DTS) server) that provides prioritization for data transport services. For example, the DTS server may receive a subscription request to subscribe to an MPS for a user device, and may generate an MPS profile for the user device based on the subscription request. The DTS server may store the MPS profile in a data structure, and may receive, from the user device, a request to generate an MPS token for the user device. The DTS server may retrieve the MPS profile from the data structure based on the request to generate the MPS token, and may generate the MPS token based on the MPS profile. The DTS server may provide the MPS token to the user device, and may receive a request to validate another MPS token associated with establishing a protocol data unit (PDU) session for the user device. The DTS server may retrieve the MPS profile from the data structure based on the request to validate the other MPS token, and may determine whether the other MPS token is valid based on the MPS profile and the MPS indicator.

In another example, the DTS server may receive a subscription request to subscribe to an MPS for a user device, and may generate an MPS profile for the user device based on the subscription request. The DTS server may store the MPS profile in a data structure, and may receive a request to authenticate the user device for utilizing the MPS. The DTS server may retrieve the MPS profile from the data structure based on the request to authenticate the user device for utilizing the MPS, and may determine whether the user device is authenticated for utilizing the MPS based on the MPS profile. The DTS server may provide a first response indicating that the user device is authenticated for utilizing the MPS, where the first response causes a PDU session to be established for the user device to utilize the MPS, or may provide a second response indicating that the user device is not authenticated for utilizing the MPS, where the second response prevents the PDU session from being established for the user device to utilize the MPS.

In this way, the DTS server provides prioritization for data transport services. For example, the DTS server may support priority for over-the-top (OTT) applications (e.g., MPSs) involving voice, video, and data sessions. The DTS server may provide on-demand access to the fifth generation (5G) MPS, and may provide a simple and flexible solution for triggering and disabling an MPS by an MPS user and/or an MPS provider. Thus, the DTS server may conserve computing resources, networking resources, and/or other resources that would otherwise have been consumed by failing to provide an MPS due to lack of a prioritized data transport mechanism, poorly handling emergency events due to lack of a prioritized data transport mechanism, failing to prioritize an MPS due to lack of a prioritized data transport mechanism, and/or the like.

FIGS. 1A-1G are diagrams of an example 100 associated with providing prioritization for data transport services. As shown in FIGS. 1A-1G, example 100 includes a user device 105, a RAN 110, a core network 115, and a DTS server 120. The core network 115 may include an access and mobility management function (AMF), a session management function (SMF), a user plane function (UPF), a policy control function/network exposure function (PCF/NEF), and a unified data management (UDM) component. Further details of the user device 105, the RAN 110, the core network 115, the DTS server 120, the AMF, the SMF, the UPF, the PCF/NEF, and the UDM are provided elsewhere herein.

As shown in FIG. 1A, and by reference number 125, the user device 105 initiate an MPS token/session request. For example, a user of the user device 105 may utilize the user device 105 to activate or deactivate the MPS. The MPS may be activated and deactivated based on the user providing an input via selection of a key, via selection of a combination of keys, via a priority access activation/deactivation application on the user device 105, and/or the like. A priority invocation period for the MPS may begin when the user activates the MPS from the user device 105 and the priority invocation period for the MPS may end when the user deactivates the MPS from the user device 105. In some implementations, the request to subscribe to the MPS may be approved by the DTS server 120 and/or one or more components of the core network 115. In some implementations, the user may cause the user device 105 to generate the MPS token/session request after the subscription to the MPS.

As further shown in FIG. 1A, and by reference number 130, the DTS server 120 may store an MPS profile for the user device 105 (e.g., for the user) in the UDM. For example, based on approving the request to subscribe to the MPS, the DTS server 120 may generate the MPS profile of the user. The MPS profile may include data identifying an authorized MPS priority level of the user, a 5G quality of service (QoS) identifier (5QI) for the MPS, allocation and retention priority (ARP) parameters for the MPS, a validity duration for the MPS, and/or the like. The DTS server 120 may store the MPS profile in the UDM, and the UDM may make the MPS profile available to the PCF/NEF. In some implementations, the DTS server may be pre-configured or discovered by the PCF/NEF.

Figure 1B:
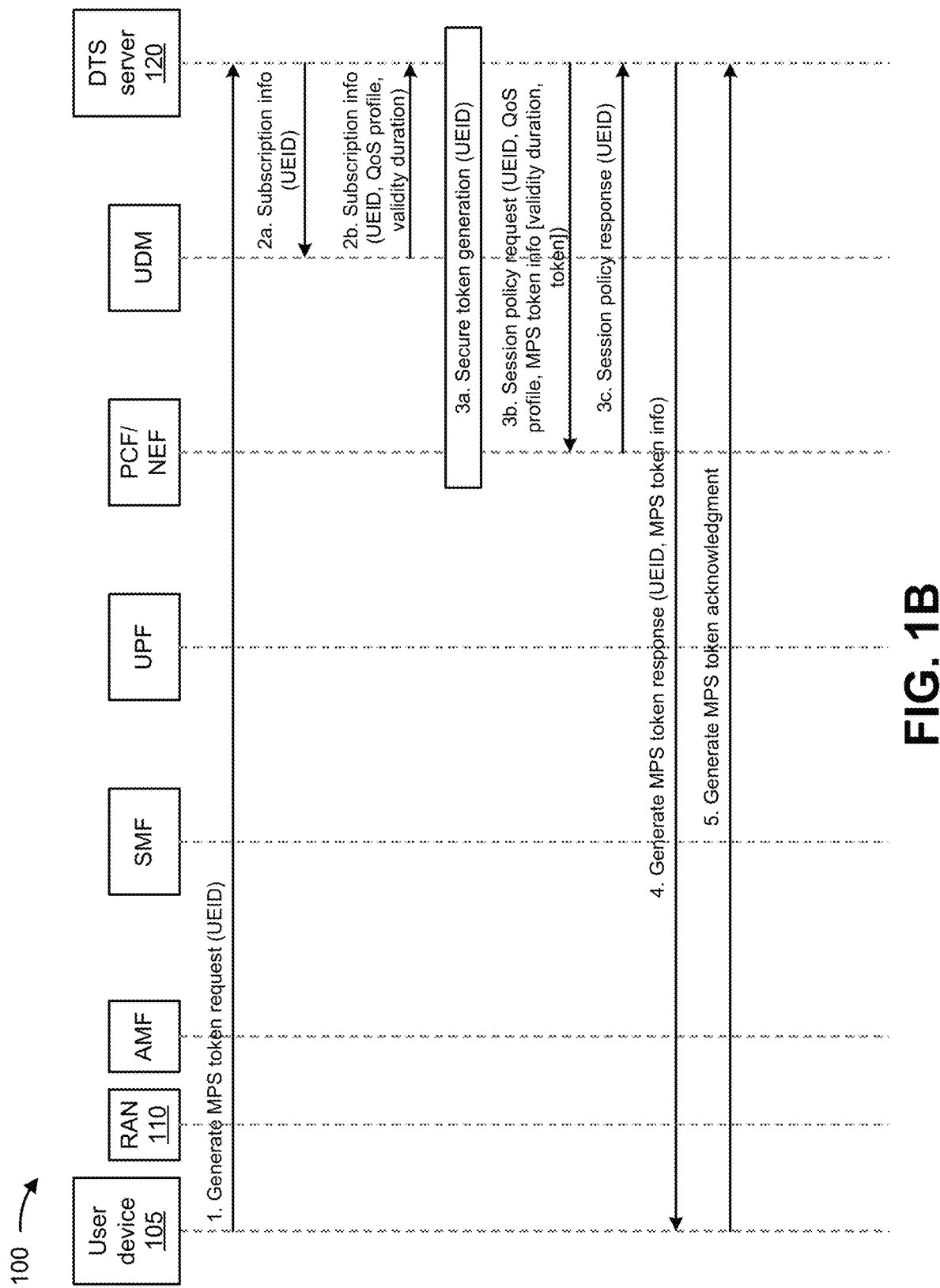

FIG. 1B depicts a call flow diagram of an example implementation associated with MPS token generation. As shown at step 1, the user device 105 may generate a request for an MPS token, and may provide the request for the MPS token to the DTS server 120. For example, a user of the user device 105 may utilize the user device 105 to request an MPS (e.g., a non-IMS) session, and the user device 105 may generate the request for the MPS token based on the request for the MPS session. The user device 105 may provide the request for the MPS token to the DTS server 120 via in-band signaling, out-of-band signaling, or a short message service (SMS) message destined for the DTS server 120. The request for the MPS token may include an identifier of the user device 105, such as an international mobile subscriber identity (IMSI) or a subscription permanent identity (SUPI).

As shown at step 2a of FIG. 1B, the DTS server 120 may receive the request for the MPS token, and may generate a subscription information request (e.g., that includes the identifier of the user device 105) based on receiving the request for the MPS token. In some implementations, the DTS server 120 may include an application function (AF) of the core network 115. The subscription information request may include the identifier of the user device 105 and data requesting a QoS profile of the user device 105 (or the user) and subscription information associated with the user device 105 (or the user). The DTS server 120 may provide the subscription information request to the UDM, and the UDM may receive the subscription information request. As shown at step 2b, the UDM may retrieve, based on the identifier of the user device 105, the QoS profile of the user device 105 and the subscription information, and may provide the QoS profile and the subscription information (e.g., indicating a validity duration for the user device 105 to utilize the MPS session, as determined by the QoS profile) to the DTS server 120. The DTS server 120 may receive the QoS profile and the validity duration from the UDM, via a subscription information response.

As shown at step 3a of FIG. 1B, the DTS server 120 may generate a secure MPS token based on the identifier of the user device 105, the QoS profile, and/or the validity duration. For example, the DTS server 120 may generate the secure MPS token based on a hash function of the identifier of the user device 105. If DTS server 120 has the identifier of the user device 105 from a previous session, the DTS server 120 may immediately perform authentication of the user device 105 by validating the secure MPS token. The DTS server 120 may authenticate and/or authorize the user device 105 based on the identifier of the user device 105, the QoS profile, and/or the validity duration. As shown at step 3b, the DTS server 120 may provide a session policy request to the PCF/NEF. The session policy request may include the identifier of the user device 105, the QoS profile, and MPS token information (e.g., the validity duration and the secure MPS token). The PCF/NEF and/or the UDM may cache the MPS token information for quick access and/or processing. As shown at step 3c, the DTS server 120 may receive a session policy response (e.g., indicating receipt of the session policy request) from the PCF/NEF.

As shown at step 4 of FIG. 1B, after successful authentication of the user device 105 and authorization of the MPS access by the user device 105, the DTS server 120 may provide the MPS token information to the user device 105 (e.g., via a generate MPS token response message). The user device 105 may receive the generate MPS token response message from the DTS server 120 may generate an MPS token acknowledgement message indicating receipt of the generate MPS token response message. As shown at step 5, the user device 105 may provide the MPS token acknowledgement message to the DTS server 120, and the DTS server 120 may receive the MPS token acknowledgement message.

Figure 1C:
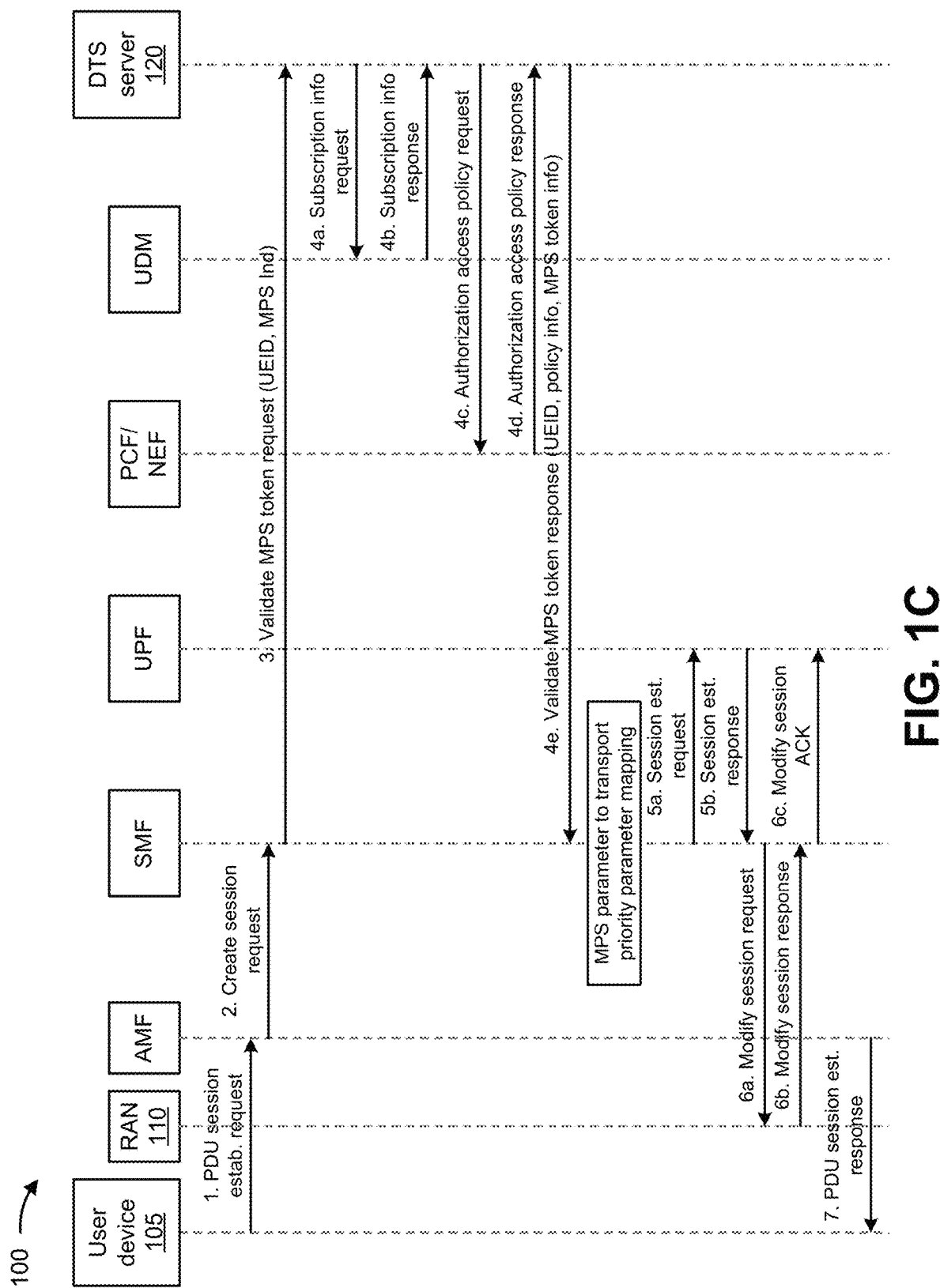

FIG. 1C depicts a call flow diagram of an example implementation associated with MPS session establishment. As shown at step 1, the user device 105 may provide a PDU session establishment request to the AMF. For example, the user device 105 may generate a PDU session establishment request for an MPS session. The PDU session establishment request may include the identifier of the user device 105 and an MPS indicator indicating that the PDU session establishment request is an MPS session request. The AMF may receive the PDU session establishment request from the user device 105. As shown at step 2, the AMF may generate a create session request (e.g., with the identifier of the user device 105 and the MPS indicator) based on the PDU session establishment request. The AMF may provide the create session request to the SMF (e.g., via an N11 interface), and the SMF may receive the create session request.

As shown at step 3 of FIG. 1C, the SMF may generate, based on the create session request, a validate MPS token request that includes the identifier of the user device 105 and the MPS indicator. The SMF may provide the validate MPS token request to the DTS server 120, and the DTS server 120 may receive the validate MPS token request. The validate MPS token request may request that the DTS server 120 authenticate and authorize an MPS session for the user device 105. Alternatively, another network function (e.g., an IMS proxy call session control function (P-CSCF)) may request that the DTS server 120 authenticate and authorize an MPS session for the user device 105.

As shown at step 4a of FIG. 1C, the DTS server 120 may generate a subscription information request (e.g., that includes the identifier of the user device 105 and the MPS indicator) based on receiving the validate MPS token request. The subscription information request may include the identifier of the user device 105, the MPS indicator, and data requesting MPS parameters (e.g., the authorized MPS priority level of the user device 105, a 5QI for the MPS, and ARP parameters for the MPS). The DTS server 120 may provide the subscription information request to the UDM, and the UDM may receive the subscription information request. As shown at step 4b, the UDM may retrieve, based on the identifier of the user device 105, the MPS parameters, and may provide the MPS parameters to the DTS server 120. The DTS server 120 may receive the MPS parameters from the UDM, via a subscription information response.

As shown at step 4c of FIG. 1C, the DTS server 120 may generate an authorization access policy request, and may provide the authorization access policy request to the PCF/NEF. The authorization access policy request may include a request for authorization of an access policy, the identifier of the user device 105, and MPS token information. The PCF/NEF may receive the authorization access policy request, may authorize the access policy, and may generate an authorization access policy response (e.g., with the authorization and access policy information). As shown at step 4d, the PCF/NEF may provide the authorization access policy response to the DTS server 120, and the DTS server 120 may receive the authorization access policy response. As shown at step 4e, the DTS server 120 may validate the MPS token request for the MPS parameters and the authorization and access policy information, and may generate a validate MPS token response that includes the identifier of the user device 105, the authorization and access policy information, and the MPS token information (e.g., the MPS parameters). The DTS server 120 may provide the validate MPS token response to the SMF, and the SMF may receive the validate MPS token response.

As further shown in FIG. 1C, the SMF may generate MPS parameters to transport priority parameters mapping based on receiving the validate MPS token response. As shown at step 5a, the SMF may generate a session establishment request that includes the identifier of the user device 105 and the transport priority parameters, and may provide the session establishment request to the UPF. The session establishment request may request that the UPF allocate priority resources on the UPF. The UPF may allocate the priority resources on the UPF (e.g., that provides QoS priority support at the UPF) based on the session establishment request, and may generate a session establishment response indicating allocation of the priority resources at the UPF. As shown at step 5b, the UPF may provide the session establishment response to the SMF.

As shown at step 6a, the SMF may generate a modify session request that includes the identifier of the user device 105 and the transport priority parameters. The modify session request may request modification of an existing QoS from the RAN 110, via the AMF. The SMF may provide the modify session request to the RAN 110, via the AMF. As shown at step 6b, the RAN 110 may modify the existing QoS from the RAN 110 based on the modify session request, and may generate a modify session response indicating that the existing QoS from the RAN 110 is modified. The RAN 110 may provide the modify session response to the SMF, via the AMF. As shown at step 6c, the SMF may generate a modify session acknowledgement message, and may provide the modify session acknowledgement message to the UPF. As shown at step 7, the AMF may generate a PDU session establishment response that includes the identifier of the user device 105 and the 5QI for the MPS. The AMF may provide the PDU session establishment response to the user device 105.

Figure 1D:
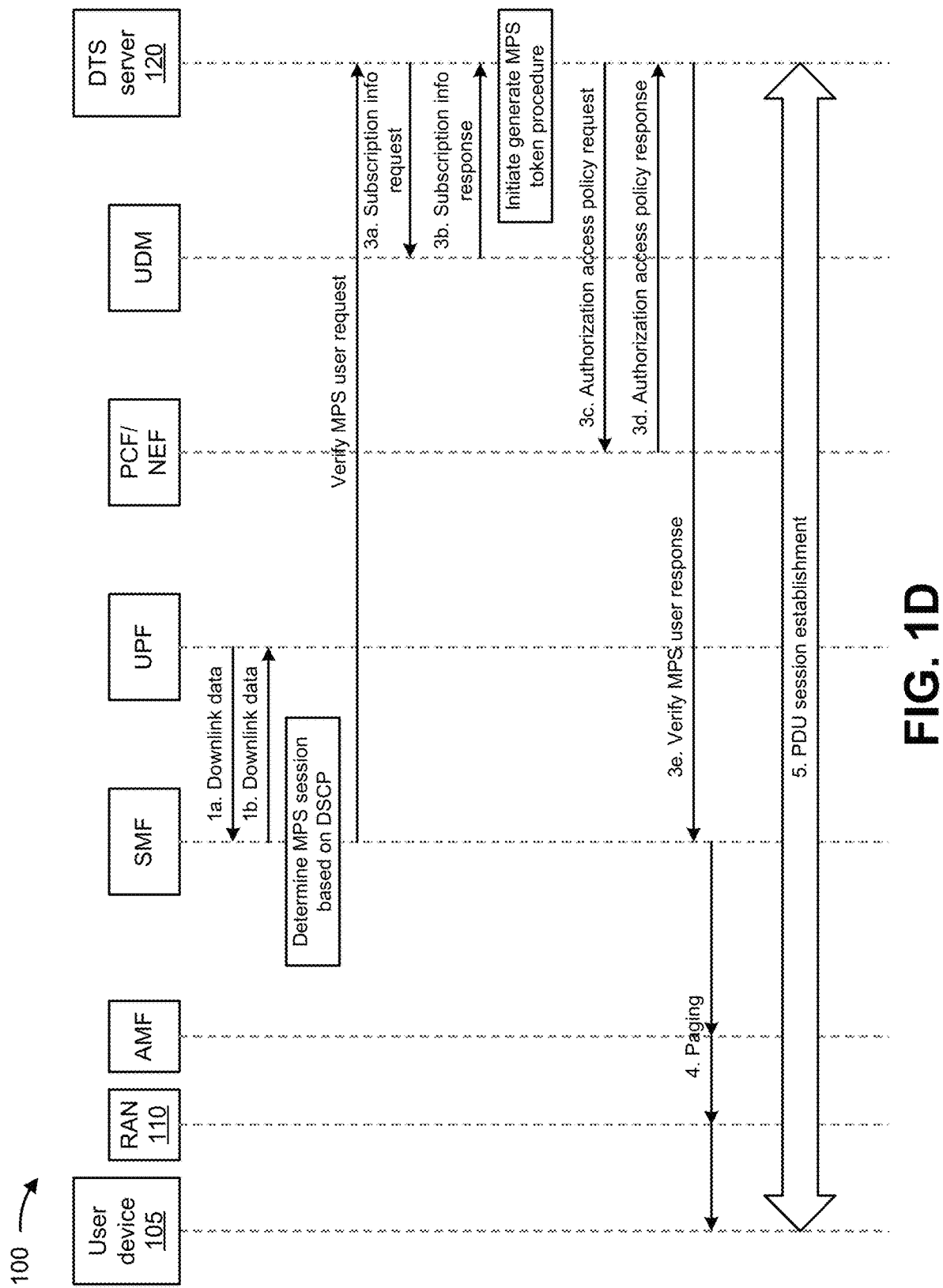

FIG. 1D depicts a call flow diagram of an example implementation associated with MPS session termination. As shown at step 1a, the UPF may receive, from a peer, downlink data that includes a QoS flow identifier (QFI) and a differentiated services code point (DSCP) value, and the UPF may provide the downlink data to the SMF. As shown at step 1b, the UPF may generate a downlink data receipt acknowledgment message based on receiving the downlink data, and may provide the downlink data receipt acknowledgement message to the UPF. As further shown in FIG. 1D, the SMF may determine that the downlink data (e.g., an incoming session) is an MPS session based on the QFI and the DSCP value included in the downlink data.

As shown at step 2 of FIG. 1D, the SMF may generate a verify MPS user request that includes the identifier of the user device 105 and a request to authenticate the user device 105 and to authorize the MPS for the user device 105. The SMF may provide the verify MPS user request to the DTS server 120, and the DTS server 120 may receive the verify MPS user request. In some implementations, information identifying the DTS server 120 may be pre-configured in the SMF or may be discovered by the SMF using an alternative mechanism (e.g., a subscription to a network function repository function (NRF)).

As shown at step 3a of FIG. 1D, the DTS server 120 may generate a subscription information request (e.g., that includes the identifier of the user device 105) based on receiving the verify MPS user request. The subscription information request may include the identifier of the user device 105 and data requesting MPS parameters (e.g., the authorized MPS priority level of the user device 105, a 5QI for the MPS, and ARP parameters for the MPS). The DTS server 120 may provide the subscription information request to the UDM, and the UDM may receive the subscription information request. As shown at step 3b, the UDM may retrieve, based on the identifier of the user device 105, the MPS parameters, and may provide the MPS parameters to the DTS server 120. The DTS server 120 may receive the MPS parameters from the UDM, via a subscription information response.

As further shown in FIG. 1D, the DTS server 120 may determine whether an MPS token exists for the user device 105. If an MPS token does not exist for the user device 105, the DTS server 120 may generate an MPS token for the user device 105, as described above in connection with FIG. 1B. If an MPS token does not exist for the user device 105, but the user device 105 is subscribed to the MPS, the DTS server 120 may allow the session as an MPS session and may provide the generated MPS token to the user device 105 (e.g., in a PDU session establishment response message).

As shown at step 3c of FIG. 1D, the DTS server 120 may generate an authorization access policy request, and may provide the authorization access policy request to the PCF/NEF. The authorization access policy request may include a request for authorization of an access policy, the identifier of the user device 105, and MPS token information. The PCF/NEF may receive the authorization access policy request, may authorize the access policy, and may generate an authorization access policy response (e.g., with the authorization and access policy information). As shown at step 3d, the PCF/NEF may provide the authorization access policy response to the DTS server 120, and the DTS server 120 may receive the authorization access policy response. As shown at step 3e, the DTS server 120 may verify the MPS user request for the MPS parameters and the authorization and access policy information, and may generate a verify MPS user response that includes the identifier of the user device 105 and the MPS token information (e.g., the MPS parameters). The DTS server 120 may provide the verify MPS user response to the SMF, and the SMF may receive the verify MPS user response.

As shown at step 4 of FIG. 1D, once the verify MPS user response is received from the DTS server 120, the SMF may generate a priority paging request that includes the identifier of the user device 105, the MPS indicator, and the MPS token information. The SMF may provide the priority paging request to the user device 105, via the AMF and the RAN 110. As shown at step 5, the user device 105 may invoke the session establishment procedure, as described above in connection with FIG. 1C, as a response to the priority paging. The priority support may be established at a termination of a priority session between the user device 105 and the UPF.

Figure 1E:
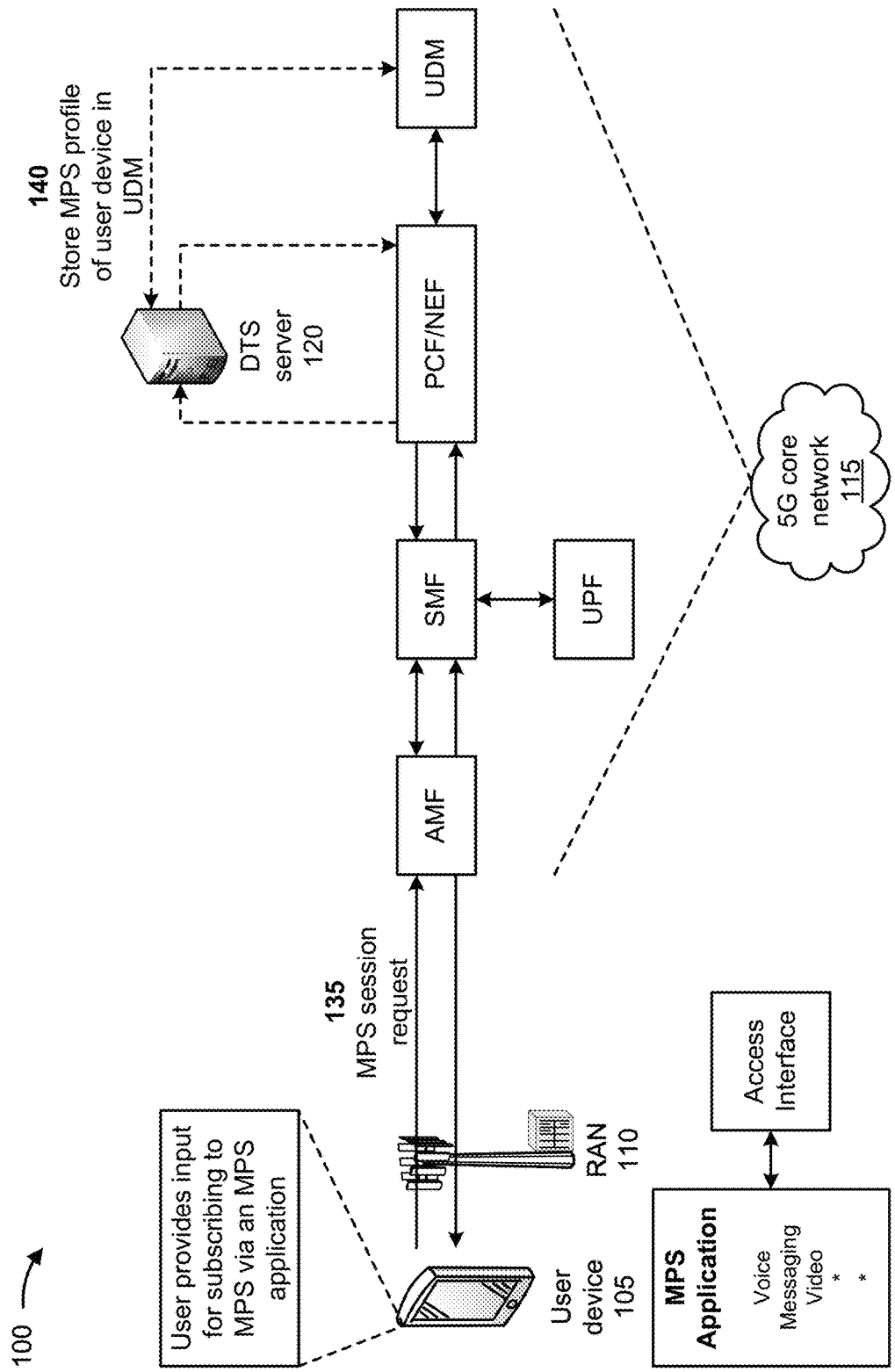

As shown in FIG. 1E, and by reference number 135, the user device 105 may generate an MPS session request. For example, as a part of the subscription, the user device 105 may be authorized to have a priority profile on the user device 105 that includes applications used for invoking MPS (e.g., voice, video, messaging, and data sessions). For example, a user of the user device 105 may utilize a priority message using a messaging application from the priority profile. At the same time, the user of the user device 105 may also utilize a voice application from a native dialer of user device 105 from other profiles, such as a "personal" profile or a "work" profile. In some implementations, the request to subscribe to the MPS may be approved by the DTS server 120 and/or one or more components of the core network 115. In some implementations, the user may cause the user device 105 to generate the MPS session request after the subscription to the MPS.

As further shown in FIG. 1E, and by reference number 140, the DTS server 120 may store an MPS profile for the user device 105 (e.g., for the user) in the UDM. For example, based on approving the request to subscribe to the MPS, the DTS server 120 may generate the MPS profile of the user. The MPS profile may include data identifying an authorized MPS priority level of the user, a 5QI for the MPS, ARP parameters for the MPS, a validity duration for the MPS, and/or the like. The DTS server 120 may store the MPS profile in the UDM, and the UDM may make the MPS profile available to the PCF/NEF. In some implementations, the DTS server may be pre-configured or discovered by the PCF/NEF.

Figure 1F:
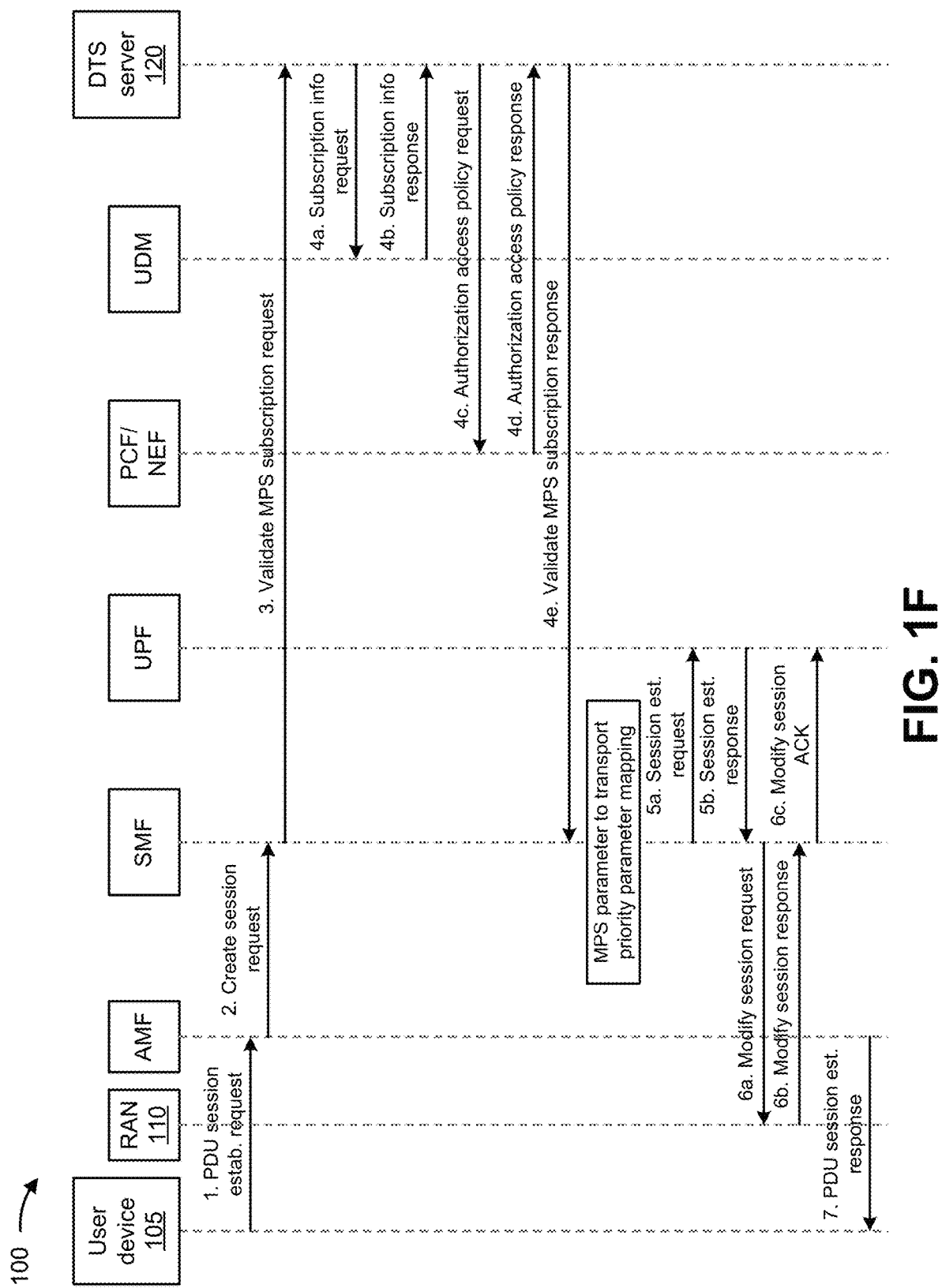

FIG. 1F depicts a call flow diagram of an example implementation associated with MPS session establishment. As shown at step 1, the user device 105 may provide a PDU session establishment request to the AMF. For example, the user device 105 may generate a PDU session establishment request for an MPS session. The PDU session establishment request may include the identifier of the user device 105 and an MPS priority indicator indicating that the PDU session establishment request is an MPS session request. The AMF may receive the PDU session establishment request from the user device 105. As shown at step 2, the AMF may generate a create session request (e.g., with the identifier of the user device 105 and the MPS indicator) based on the PDU session establishment request. The AMF may provide the create session request to the SMF (e.g., via an N11 interface), and the SMF may receive the create session request.

As shown at step 3 of FIG. 1F, the SMF may generate, based on the create session request, a validate MPS subscription request that includes the identifier of the user device 105. The SMF may provide the validate MPS subscription request to the DTS server 120, and the DTS server 120 may receive the validate MPS subscription request. The validate MPS subscription request may request that the DTS server 120 authenticate and authorize an MPS session for the user device 105. Alternatively, another network function (e.g., an IMS P-CSCF) may request that the DTS server 120 authenticate and authorize an MPS session for the user device 105.

As shown at step 4a of FIG. 1F, the DTS server 120 may generate a subscription information request (e.g., that includes the identifier of the user device 105) based on receiving the validate MPS subscription request. The subscription information request may include the identifier of the user device 105 and data requesting MPS parameters (e.g., the authorized MPS priority level of the user device 105, a 5QI for the MPS, and ARP parameters for the MPS). The DTS server 120 may provide the subscription information request to the UDM, and the UDM may receive the subscription information request. As shown at step 4b, the UDM may retrieve, based on the identifier of the user device 105, the MPS parameters, and may provide the MPS parameters to the DTS server 120. The DTS server 120 may receive the MPS parameters from the UDM, via a subscription information response.

As shown at step 4c of FIG. 1F, the DTS server 120 may generate an authorization access policy request, and may provide the authorization access policy request to the PCF/NEF. The authorization access policy request may include a request for authorization of an access policy and the identifier of the user device 105. The PCF/NEF may receive the authorization access policy request, may authorize the access policy, and may generate an authorization access policy response (e.g., with the authorization and access policy information). As shown at step 4d, the PCF/NEF may provide the authorization access policy response to the DTS server 120, and the DTS server 120 may receive the authorization access policy response. As shown at step 4e, the DTS server 120 may validate the MPS subscription request for the MPS parameters and the authorization and access policy information, and may generate a validate MPS subscription response that includes the identifier of the user device 105 and the authorization and access policy information. The DTS server 120 may provide the validate MPS subscription response to the SMF, and the SMF may receive the validate MPS token response.

As further shown in FIG. 1F, the SMF may generate MPS parameters to transport priority parameters mapping based on receiving the validate MPS subscription response. As shown at step 5a, the SMF may generate a session establishment request that includes the identifier of the user device 105 and the transport priority parameters, and may provide the session establishment request to the UPF. The session establishment request may request that UPF allocate priority resources on the UPF. The UPF may allocate the priority resources on the UPF (e.g., that provides QoS priority support at the UPF) based on the session establishment request, and may generate a session establishment response indicating allocation of the priority resources at the UPF. As shown at step 5b, the UPF may provide the session establishment response to the SMF.

As shown at step 6a, the SMF may generate a modify session request that includes the identifier of the user device 105 and the transport priority parameters. The modify session request may request modification of an existing QoS from the RAN 110, via the AMF. The SMF may provide the modify session request to the RAN 110, via the AMF. As shown at step 6b, the RAN 110 may modify the existing QoS from the RAN 110 based on the modify session request, and may generate a modify session response indicating that the existing QoS from the RAN 110 is modified. The RAN 110 may provide the modify session response to the SMF, via the AMF. As shown at step 6c, the SMF may generate a modify session acknowledgement message, and may provide the modify session acknowledgement message to the UPF. As shown at step 7, the AMF may generate a PDU session establishment response that includes the identifier of the user device 105 and the 5QI for the MPS. The AMF may provide the PDU session establishment response to the user device 105.

Figure 1G:
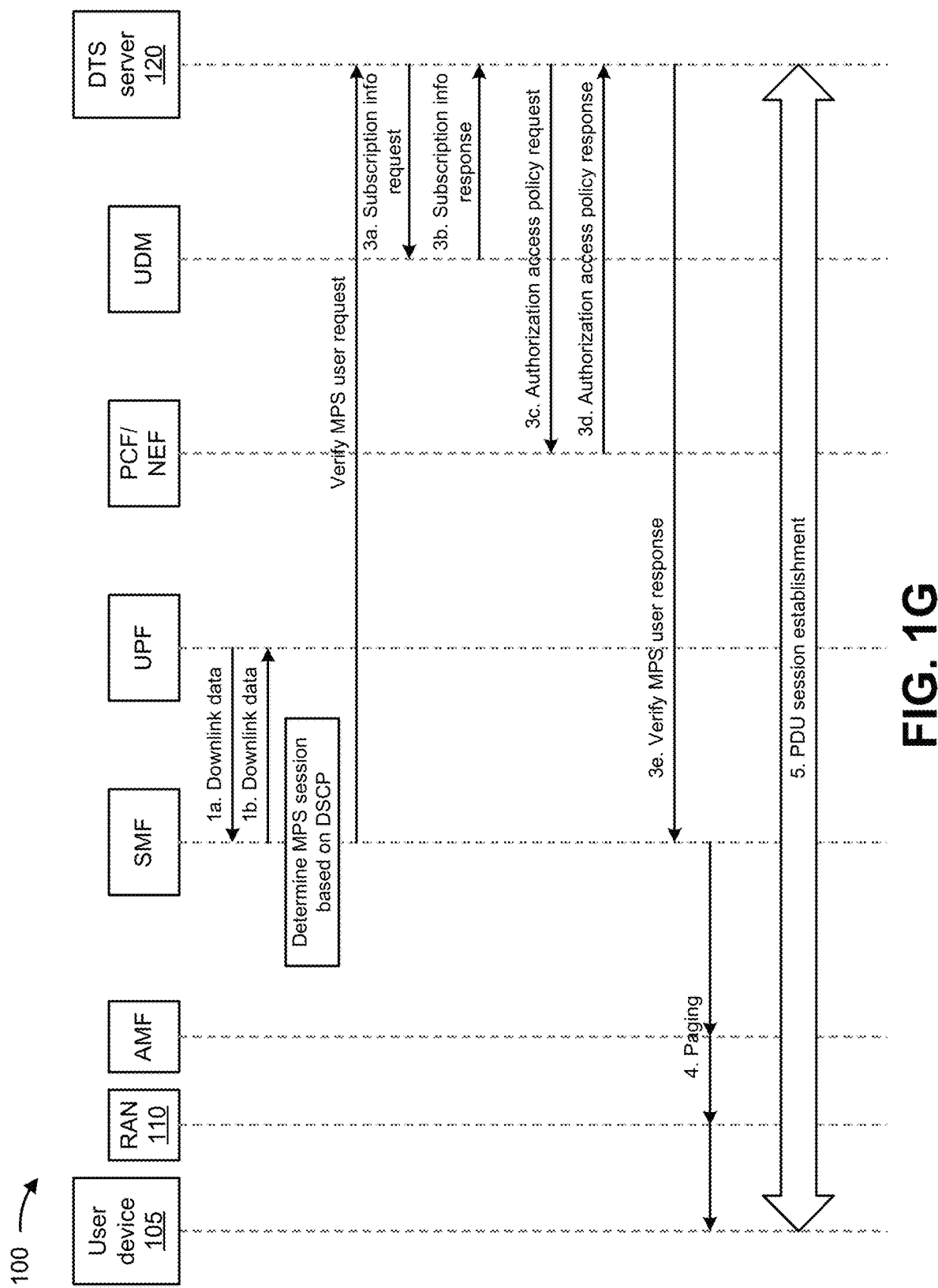

FIG. 1G depicts a call flow diagram of an example implementation associated with MPS session termination. As shown at step 1*a*, the UPF may receive, from a peer, downlink data that includes a QFI and a DSCP value, and the UPF may provide the downlink data to the SMF. As shown at step 1*b*, the UPF may generate a downlink data receipt acknowledgment message based on receiving the downlink data, and may provide the downlink data receipt acknowledgement message to the UPF. As further shown in FIG. 1G, the SMF may determine that the downlink data (e.g., an incoming session) is an MPS session based on the QFI and the DSCP value included in the downlink data.

As shown at step 2 of FIG. 1G, the SMF may generate a verify MPS user request that includes the identifier of the user device 105 and a request to authenticate the user device 105 and to authorize the MPS for the user device 105. The SMF may provide the verify MPS user request to the DTS server 120, and the DTS server 120 may receive the verify MPS user request. In some implementations, information identifying the DTS server 120 may be pre-configured in the SMF or may be discovered by the SMF using an alternative mechanism (e.g., a subscription to an NRF).

As shown at step 3*a* of FIG. 1G, the DTS server 120 may generate a subscription information request (e.g., that includes the identifier of the user device 105) based on receiving the verify MPS user request. The subscription information request may include the identifier of the user device 105 and data requesting MPS parameters (e.g., the authorized MPS priority level of the user device 105, a 5QI for the MPS, and ARP parameters for the MPS). The DTS server 120 may provide the subscription information request to the UDM, and the UDM may receive the subscription information request. As shown at step 3*b*, the UDM may retrieve, based on the identifier of the user device 105, the MPS parameters, and may provide the MPS parameters to the DTS server 120. The DTS server 120 may receive the MPS parameters from the UDM, via a subscription information response.

As shown at step 3*c* of FIG. 1G, the DTS server 120 may generate an authorization access policy request, and may provide the authorization access policy request to the PCF/NEF. The authorization access policy request may include a request for authorization of an access policy, the identifier of the user device 105, and the MPS parameters. The PCF/NEF may receive the authorization access policy request, may authorize the access policy, and may generate an authorization access policy response (e.g., with the authorization and access policy information). As shown at step 3*d*, the PCF/NEF may provide the authorization access policy response to the DTS server 120, and the DTS server 120 may receive the authorization access policy response. As shown at step 3*e*, the DTS server 120 may verify the MPS user request for the MPS parameters and the authorization and access policy information, and may generate a verify MPS user response that includes the identifier of the user device 105 and the MPS parameter. The DTS server 120 may provide the verify MPS user response to the SMF, and the SMF may receive the verify MPS user response.

As shown at step 4 of FIG. 1G, once the verify MPS user response is received from the DTS server 120, the SMF may generate a priority paging request that includes the identifier of the user device 105. The SMF may provide the priority paging request to the user device 105, via the AMF and the RAN 110. As shown at step 5, the user device 105 may invoke the session establishment procedure, as described above in connection with FIG. 1F, as a response to the priority paging. The priority support may be established at a termination of a priority session between the user device 105 and the UPF.

In this way, the DTS server 120 provides prioritization for data transport services. For example, the DTS server 120 may support priority for OTT applications (e.g., MPSs) involving voice, video, and data sessions. The DTS server 120 may provide on-demand access to the 5G MPS, and may provide a simple and flexible solution for triggering and disabling an MPS by an MPS user and/or an MPS provider. Thus, the DTS server 120 may conserve computing resources, networking resources, and/or other resources that would otherwise have been consumed by failing to provide an MPS due to lack of a prioritized data transport mechanism, poorly handling emergency events due to lack of a prioritized data transport mechanism, failing to prioritize an MPS to due lack of a prioritized data transport mechanism, and/or the like.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
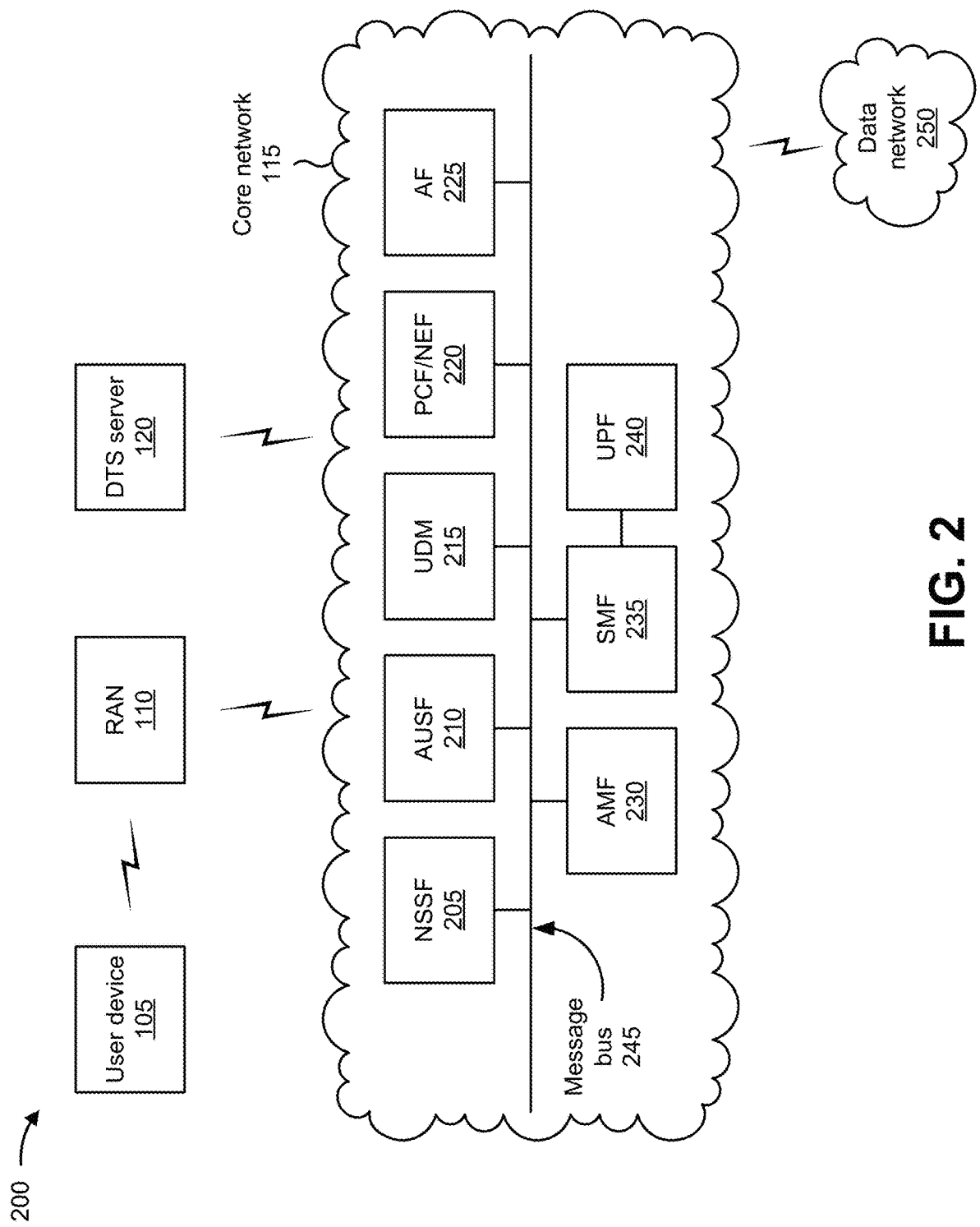
FIG. 2 is a diagram of an example environment in which systems and/or methods described herein may be implemented.

FIG. 2 is a diagram of an example environment 200 in which systems and/or methods described herein may be implemented. As shown in FIG. 2, the example environment 200 may include the user device 105, the RAN 110, the core network 115, the DTS server 120 and a data network 250. Devices and/or networks of the example environment 200 may interconnect via wired connections, wireless connections, or a combination of wired and wireless connections.

The user device 105 includes one or more devices capable of receiving, generating, storing, processing, and/or providing information, such as information described herein. For example, the user device 105 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device.

The RAN 110 may support, for example, a cellular radio access technology (RAT). The RAN 110 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for the user device 105. The RAN 110 may transfer traffic between the user device 105 (e.g., using a cellular RAT), one or more base stations (e.g., using a wireless interface or a backhaul interface, such as a wired backhaul interface), and/or the core network 115. The RAN 110 may provide one or more cells that cover geographic areas.

In some implementations, the RAN 110 may perform scheduling and/or resource management for the user device 105 covered by the RAN 110 (e.g., the user device 105 covered by a cell provided by the RAN 110). In some implementations, the RAN 110 may be controlled or coordinated by a network controller, which may perform load balancing, network-level configuration, and/or other operations. The network controller may communicate with the RAN 110 via a wireless or wireline backhaul. In some implementations, the RAN 110 may include a network controller, a self-organizing network (SON) module or component, or a similar module or component. In other words, the RAN 110 may perform network control, scheduling, and/or network management functions (e.g., for uplink, downlink, and/or sidelink communications of the user device 105 covered by the RAN 110).

In some implementations, the terms "base station" (e.g., the RAN 110) or "network node" or "network entity" may refer to an aggregated base station, a disaggregated base station, an integrated access and backhaul (IAB) node, a relay node, and/or one or more components thereof. For example, in some implementations, "base station," "network node," or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some implementations, the term "base station," "network node," or "network entity" may refer to one device configured to perform one or more functions, such as those described herein in connection with the RAN 110. In some implementations, the terms "base station," "network node," or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the terms "base station," "network node," or "network entity" may refer to any one or more of those different devices. In some implementations, the terms "base station," "network node," or "network entity" may refer to one or more virtual base stations and/or one or more virtual base station functions. For example, in some implementations, two or more base station functions may be instantiated on a single device. In some implementations, the terms "base station," "network node," or "network entity" may refer to one of the base station functions and not another. In this way, a single device may include more than one base station.

The DTS server 120 may include one or more devices capable of receiving, generating, storing, processing, providing, and/or routing information, as described elsewhere herein. The DTS server 120 may include a communication device and/or a computing device. For example, the DTS server 120 may include a server, such as an application server, a client server, a web server, a database server, a host server, a proxy server, a virtual server (e.g., executing on computing hardware), or a server in a cloud computing system. In some implementations, the DTS server 120 may include computing hardware used in a cloud computing environment.

In some implementations, the core network 115 may include an example functional architecture in which systems and/or methods described herein may be implemented. For example, the core network 115 may include an example architecture of a 5G next generation (NG) core network included in a 5G wireless telecommunications system. While the example architecture of the core network 115 shown in FIG. 2 may be an example of a service-based architecture, in some implementations, the core network 115 may be implemented as a reference-point architecture and/or a 4G core network, among other examples.

As shown in FIG. 2, the core network 115 may include a number of functional elements. The functional elements may include, for example, a network slice selection function (NSSF) 205, an authentication server function (AUSF) 210, a UDM component 215, a PCF/NEF 220, an AF 225, an AMF 230, an SMF 235, and/or a UPF 240. The functional elements may be communicatively connected via a message bus 245. Each of the functional elements shown in FIG. 2 is implemented on one or more devices associated with a wireless telecommunications system. In some implementations, one or more of the functional elements may be implemented on physical devices, such as an access point, a base station, and/or a gateway. In some implementations, one or more of the functional elements may be implemented on a computing device of a cloud computing environment.

The NSSF 205 includes one or more devices that select network slice instances for the user device 105. By providing network slicing, the NSSF 205 allows an operator to deploy multiple substantially independent end-to-end networks potentially with the same infrastructure. In some implementations, each slice may be customized for different services.

The AUSF 210 includes one or more devices that act as an authentication server and support the process of authenticating the user device 105 in the wireless telecommunications system.

The UDM 215 includes one or more devices that store user data and profiles in the wireless telecommunications system. The UDM 215 may be used for fixed access and/or mobile access in the core network 115.

The PCF/NEF 220 includes one or more devices that provide a policy framework that incorporates network slicing, roaming, packet processing, and/or mobility management, among other examples. The PCF/NEF 220 may facilitate secure and robust access to exposed network services and capabilities of the core network 115.

The AF 225 includes one or more devices that support application influence on traffic routing, access to a network exposure function (NEF), and/or policy control, among other examples.

The AMF 230 includes one or more devices that act as a termination point for non-access stratum (NAS) signaling and/or mobility management, among other examples.

The SMF 235 includes one or more devices that support the establishment, modification, and release of communication sessions in the wireless telecommunications system. For example, the SMF 235 may configure traffic steering policies at the UPF 240 and/or may enforce user equipment IP address allocation and policies, among other examples.

The UPF 240 includes one or more devices that serve as an anchor point for intraRAT and/or interRAT mobility. The UPF 240 may apply rules to packets, such as rules pertaining to packet routing, traffic reporting, and/or handling user plane QoS, among other examples.

The message bus 245 represents a communication structure for communication among the functional elements. In other words, the message bus 245 may permit communication between two or more functional elements.

The data network 250 includes one or more wired and/or wireless data networks. For example, the data network 250 may include an IMS, a PLMN, a LAN, a WAN, a MAN, a private network such as a corporate intranet, an ad hoc network, the Internet, a fiber optic-based network, a cloud computing network, a third party services network, an operator services network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the example environment 200 may perform one or more functions described as being performed by another set of devices of the example environment 200.

Figure 3:
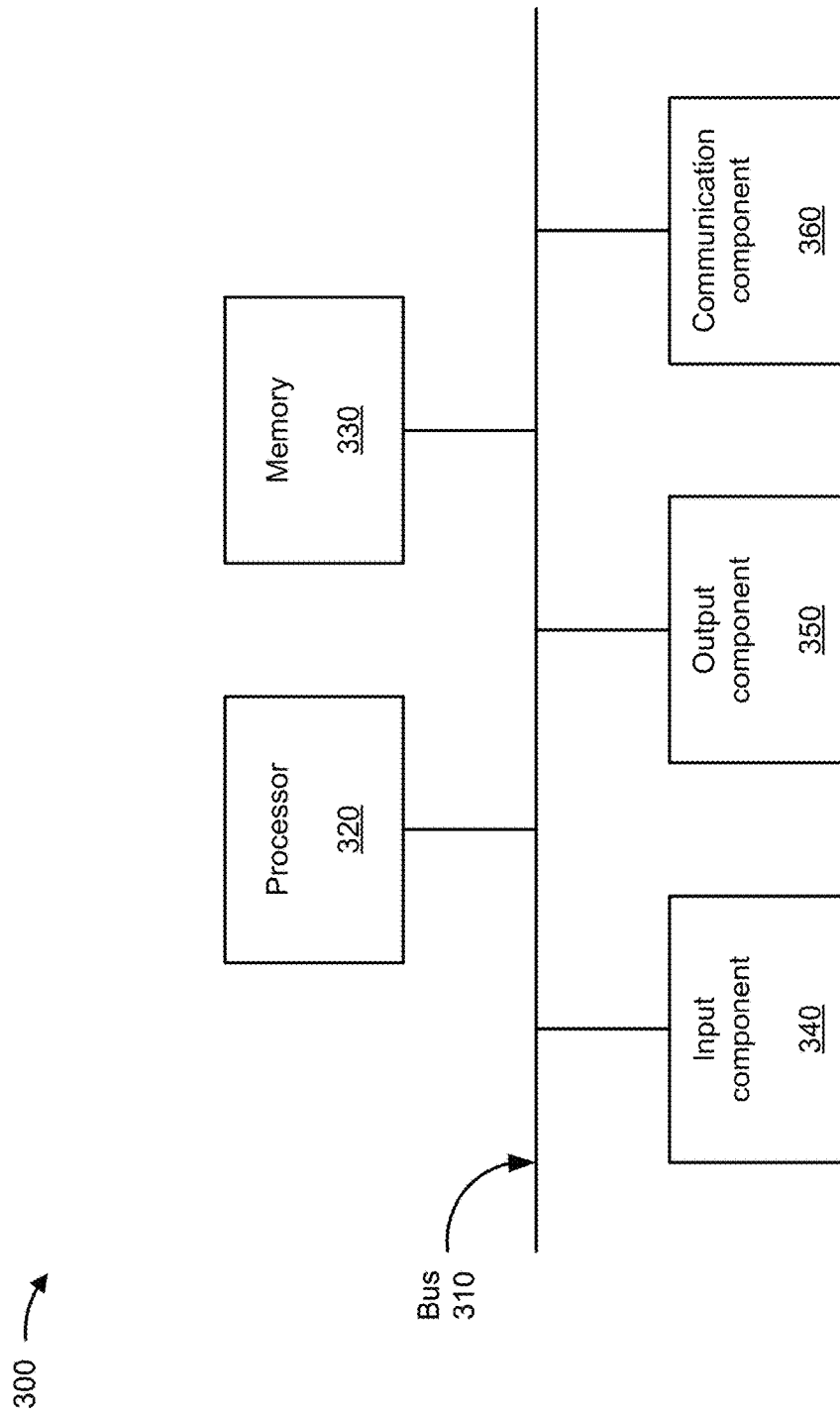
FIG. 3 is a diagram of example components of one or more devices of FIG. 2.

FIG. 3 is a diagram of example components of a device 300, which may correspond to the user device 105, the RAN 110, the DTS server 120, the NSSF 205, the AUSF 210, the UDM 215, the PCF/NEF 220, the AF 225, the AMF 230, the SMF 235, and/or the UPF 240. In some implementations, the user device 105, the RAN 110, the DTS server 120, the NSSF 205, the AUSF 210, the UDM 215, the PCF/NEF 220, the AF 225, the AMF 230, the SMF 235, and/or the UPF 240 may include one or more devices 300 and/or one or more components of the device 300. As shown in FIG. 3, the device 300 may include a bus 310, a processor 320, a memory 330, an input component 340, an output component 350, and a communication component 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. Memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication component 360 enables the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hard-wired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
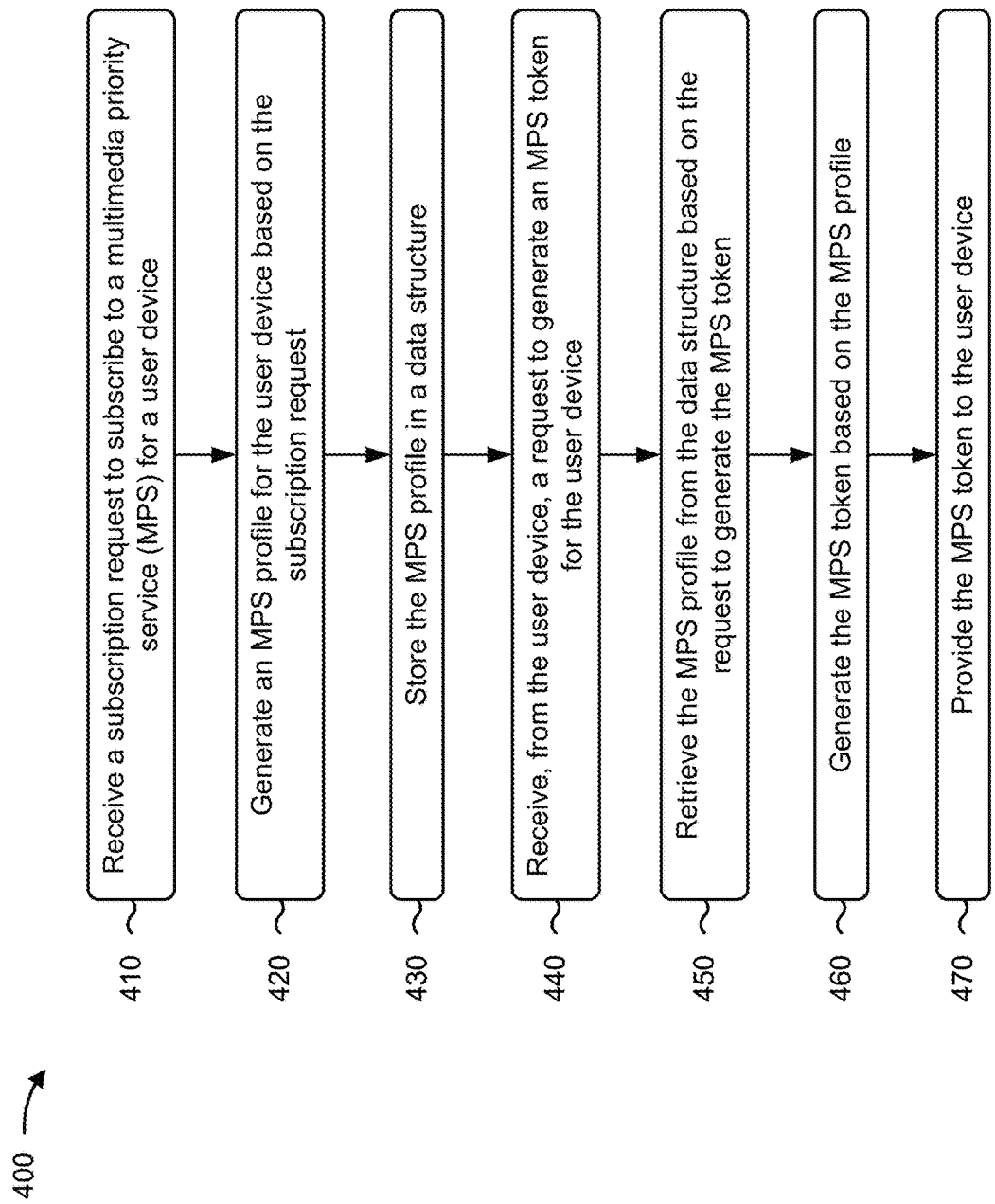
FIG. 4 is a flowchart of an example process for providing prioritization for data transport services.

FIG. 4 is a flowchart of an example process 400 for providing prioritization for data transport services. In some implementations, one or more process blocks of FIG. 4 may be performed by a network device (e.g., the DTS server 120). In some implementations, one or more process blocks of FIG. 4 may be performed by another device or a group of devices separate from or including the network device, such as an AMF (e.g., the AMF 230), an SMF (e.g., the SMF 235), a UPF (e.g., the UPF 240), and/or a PCF/NEF (e.g., the PCF/NEF 220). Additionally, or alternatively, one or more process blocks of FIG. 4 may be performed by one or more components of the device 300, such as the processor 320, the memory 330, the input component 340, the output component 350, and/or the communication component 360.

As shown in FIG. 4, process 400 may include receiving a subscription request to subscribe to an MPS for a user device (block 410). For example, the network device may receive a subscription request to subscribe to an MPS for a user device, as described above. In some implementations, the MPS includes a priority service for voice, data, and content.

As further shown in FIG. 4, process 400 may include generating an MPS profile for the user device based on the subscription request (block 420). For example, the network device may generate an MPS profile for the user device based on the subscription request, as described above. In some implementations, the MPS profile includes data identifying one or more of an authorized MPS priority level of the user device, a fifth generation quality of service identifier for the MPS, allocation and retention priority parameters for the MPS, or a validity duration for the MPS.

As further shown in FIG. 4, process 400 may include storing the MPS profile in a data structure (block 430). For example, the network device may store the MPS profile in a data structure, as described above.

As further shown in FIG. 4, process 400 may include receiving, from the user device, a request to generate an MPS token for the user device (block 440). For example, the network device may receive, from the user device, a request to generate an MPS token for the user device, as described above.

As further shown in FIG. 4, process 400 may include retrieving the MPS profile from the data structure based on the request to generate the MPS token (block 450). For example, the network device may retrieve the MPS profile from the data structure based on the request to generate the MPS token, as described above.

As further shown in FIG. 4, process 400 may include generating the MPS token based on the MPS profile (block 460). For example, the network device may generate the MPS token based on the MPS profile, as described above. In some implementations, generating the MPS token based on the MPS profile includes generating a secure MPS token based on the MPS profile and an identifier associated with the user device.

As further shown in FIG. 4, process 400 may include providing the MPS token to the user device (block 470). For example, the network device may provide the MPS token to the user device, as described above.

In some implementations, process 400 includes authenticating and authorizing the user device for the MPS token based on the MPS profile, prior to generating the MPS token.

In some implementations, process 400 includes receiving a request to validate another MPS token associated with establishing a PDU session for the user device, wherein the request to validate the other MPS token includes an MPS indicator indicating that the request to validate is an MPS session request; retrieving the MPS profile from the data structure based on the request to validate the other MPS token; and determining whether the other MPS token is valid based on the MPS profile and the MPS indicator.

In some implementations, process 400 includes one of providing a first response indicating that the other MPS token is valid based on determining that the other MPS token is valid, wherein the first response causes the PDU session to be established for the user device; or providing a second response indicating that the other MPS token is not valid based on determining that the other MPS token is not valid, wherein the second response prevents the PDU session from being established for the user device.

In some implementations, process 400 includes receiving a request to authenticate the user device for utilizing another MPS, retrieving the MPS profile from the data structure based on the request to authenticate the user device for utilizing the other MPS, and determining whether the user device is authenticated for utilizing the other MPS based on the MPS profile. In some implementations, process 400 includes one of providing a first response indicating that the user device is authenticated for utilizing the other MPS, wherein the first response causes a PDU session to be established for the user device to utilize the other MPS; or providing a second response indicating that the user device is not authenticated for utilizing the other MPS, wherein the second response prevents the PDU session from being established for the user device to utilize the other MPS. In some implementations, process 400 includes generating another MPS token for the user device based on providing the second response indicating that the user device is not authenticated for utilizing the other MPS.

In some implementations, process 400 includes receiving a request to validate another MPS token associated with establishing a PDU session for the user device, wherein the request to validate the other MPS token includes an MPS priority indicator; retrieving the MPS profile from the data structure based on the request to validate the other MPS token; and determining whether the other MPS token is valid based on the MPS profile and the MPS priority indicator. In some implementations, process 400 includes one of providing a first response indicating that the other MPS token is valid based on determining that the other MPS token is valid, wherein the first response causes the PDU session to be established for the user device; or providing a second response indicating that the other MPS token is not valid based on determining that the other MPS token is not valid, wherein the second response prevents the PDU session from being established for the user device.

In some implementations, process 400 includes receiving a request to authenticate the user device for utilizing another MPS; retrieving the MPS profile from the data structure based on the request to authenticate the user device for utilizing the other MPS; determining whether the user device is authenticated for utilizing the other MPS based on the MPS profile; and providing a first response indicating that the user device is authenticated for utilizing the other MPS, wherein the first response causes the PDU session to be established for the user device to utilize the other MPS; or providing a second response indicating that the user device is not authenticated for utilizing the other MPS, wherein the second response prevents the PDU session from being established for the user device to utilize the other MPS.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
receiving, by a network device, a subscription request to subscribe to a multimedia priority service (MPS) for a user device;
generating, by the network device, an MPS profile for the user device based on the subscription request;
storing, by the network device, the MPS profile in a data structure;
receiving, by the network device and from the user device, a request to generate an MPS token for the user device;
retrieving, by the network device, the MPS profile from the data structure based on the request to generate the MPS token;
generating, by the network device, the MPS token based on the MPS profile;
providing, by the network device, the MPS token to the user device;
receiving, by the network device, a request to validate another MPS token associated with establishing a protocol data unit (PDU) session for the user device,
wherein the request to validate the other MPS token includes an MPS indicator indicating that the request to validate is an MPS session request;
retrieving, by the network device, the MPS profile from the data structure based on the request to validate the other MPS token; and
determining, by the network device, whether the other MPS token is valid based on the MPS profile and the MPS indicator.

2. The method of claim 1, wherein the MPS profile includes data identifying one or more of:
an authorized MPS priority level of the user device, a fifth generation quality of service identifier for the MPS, allocation and retention priority parameters for the MPS, or
a validity duration for the MPS.

3. The method of claim 1, wherein generating the MPS token based on the MPS profile comprises:
generating a secure MPS token based on the MPS profile and an identifier associated with the user device.

4. The method of claim 1, further comprising:
authenticating and authorizing the user device for the MPS token based on the MPS profile, prior to generating the MPS token.

5. The method of claim 1, further comprising one of:
providing a first response indicating that the other MPS token is valid based on determining that the other MPS token is valid, wherein the first response causes the PDU session to be established for the user device; or
providing a second response indicating that the other MPS token is not valid based on determining that the other MPS token is not valid, wherein the second response prevents the PDU session from being established for the user device.

6. The method of claim 1, wherein the MPS includes a priority service for voice, data, and content.

7. A network device, comprising:
one or more processors configured to:
receive a subscription request to subscribe to a multimedia priority service (MPS) for a user device;
generate an MPS profile for the user device based on the subscription request;
store the MPS profile in a data structure;
receive a request to authenticate the user device for utilizing the MPS;
retrieve the MPS profile from the data structure based on the request to authenticate the user device for utilizing the MPS; and
determine whether the user device is authenticated for utilizing the MPS based on the MPS profile;
receive a request to validate another MPS token associated with establishing a protocol data unit (PDU) session for the user device,
wherein the request to validate the other MPS token includes an MPS indicator indicating that the request to validate is an MPS session request;
retrieve the MPS profile from the data structure based on the request to validate the other MPS token; and
determine whether the other MPS token is valid based on the MPS profile and the MPS indicator.

8. The network device of claim 7, wherein the MPS profile includes data identifying one or more of:
an authorized MPS priority level of the user device, a fifth generation quality of service identifier for the MPS, allocation and retention priority parameters for the MPS, or
a validity duration for the MPS.

9. The network device of claim 7, wherein the one or more processors are further configured to one of:
provide a first response indicating that the user device is authenticated for utilizing the MPS, wherein the first response causes a protocol data unit (PDU) session to be established for the user device to utilize the MPS; or
provide a second response indicating that the user device is not authenticated for utilizing the MPS, wherein the second response prevents the PDU session from being established for the user device to utilize the MPS.

10. The network device of claim 9, wherein the first response is provided based on determining that the user device is authenticated for utilizing the MPS, and the second response is provided based on determining that the user device is not authenticated for utilizing the MPS.

11. The network device of claim 7, wherein the MPS includes a priority service for voice, data, and content.

12. The network device of claim 7, wherein the request to authenticate the user device for utilizing the MPS includes an identifier of the user device and a request to authorize the MPS for the user device.

13. The network device of claim 12, wherein the one or more processors are further configured to:
provide, to another network device, an authorization access policy request that includes a request for authorization of an access policy, an identifier of the user device, and the MPS profile; and
receive, from the other network device and based on the authorization access policy request, authorization for the access policy and access policy information.

14. A non-transitory computer-readable medium storing a set of instructions, the set of instructions comprising:
one or more instructions that, when executed by one or more processors of a network device, cause the network device to:
receive a subscription request to subscribe to a multimedia priority service (MPS) for a user device;
generate an MPS profile for the user device based on the subscription request;
store the MPS profile in a data structure;
receive, from the user device, a request to generate an MPS token for the user device;
retrieve the MPS profile from the data structure based on the request to generate the MPS token;
generate the MPS token based on the MPS profile;
provide the MPS token to the user device;
receive a request to validate another MPS token associated with establishing a protocol data unit (PDU) session for the user device,
wherein the request to validate the other MPS token includes an MPS indicator indicating that the request to validate is an MPS session request;
retrieve the MPS profile from the data structure based on the request to validate the other MPS token; and
determine whether the other MPS token is valid based on the MPS profile and the MPS indicator.

15. The non-transitory computer-readable medium of claim 14, wherein the one or more instructions, that cause the network device to generate the MPS token based on the MPS profile, cause the network device to:
generate a secure MPS token based on the MPS profile and an identifier associated with the user device.

16. The non-transitory computer-readable medium of claim 14, wherein the one or more instructions further cause the network device to:
authenticate and authorize the user device for the MPS token based on the MPS profile, prior to generating the MPS token.

17. The non-transitory computer-readable medium of claim 14, wherein the one or more instructions further cause the network device to one of:
provide a first response indicating that the other MPS token is valid based on determining that the other MPS token is valid, wherein the first response causes the PDU session to be established for the user device; or
provide a second response indicating that the other MPS token is not valid based on determining that the other MPS token is not valid, wherein the second response prevents the PDU session from being established for the user device.

18. The non-transitory computer-readable medium of claim 14, wherein the one or more instructions further cause the network device to:
receive a request to authenticate the user device for utilizing the other MPS;
retrieve the MPS profile from the data structure based on the request to authenticate the user device for utilizing the other MPS; and
determine whether the user device is authenticated for utilizing the other MPS based on the MPS profile.

19. The non-transitory computer-readable medium of claim 18, wherein the one or more instructions further cause the network device to one of:
provide a first response indicating that the user device is authenticated for utilizing the other MPS, wherein the first response causes the PDU session to be established for the user device to utilize the other MPS; or
provide a second response indicating that the user device is not authenticated for utilizing the other MPS, wherein the second response prevents the PDU session from being established for the user device to utilize the other MPS.

20. The method of claim 1, further comprising:
receiving a request to authenticate the user device for utilizing the other MPS;
retrieving the MPS profile from the data structure based on the request to authenticate the user device for utilizing the other MPS; and
determining whether the user device is authenticated.

* * * * *